United States Patent
Tanaka et al.

[19]

[11] Patent Number: 6,057,623
[45] Date of Patent: May 2, 2000

[54] DYNAMO-ELECTRIC MACHINE HAVING A HOOK SHAPED COMMUTATOR AND EQUALIZER ATTACHED THERETO

[75] Inventors: Toshinori Tanaka; Ryuichi Ikeda; Kyouhei Yamamoto; Akihiro Daikoku, all of Tokyo, Japan

[73] Assignee: Mitsubishi Denki Kabushiki Kaisha, Tokyo, Japan

[21] Appl. No.: 09/270,114

[22] Filed: Mar. 16, 1999

[30] Foreign Application Priority Data

Aug. 10, 1998 [JP] Japan ............................ 10-226315

[51] Int. Cl.[7] .......................... H02K 1/22; H02K 17/06
[52] U.S. Cl. .................... 310/206; 310/204; 310/205; 310/233; 310/234; 310/220; 310/221
[58] Field of Search ........................ 310/204, 205, 310/206, 233, 234

[56] References Cited

U.S. PATENT DOCUMENTS 3,790,835  2/1974  Takeda ............................... 310/268
4,326,140  4/1982  Rohloff .............................. 310/234
4,376,903  3/1983  Mishima ............................ 310/154
4,417,388  11/1983 Major ................................. 29/598
4,425,519  1/1984  Balke et al. ....................... 310/45
4,568,862  2/1986  Tassinario ......................... 318/254
4,691,133  9/1987  Mongeau ........................... 310/178

FOREIGN PATENT DOCUMENTS 56-149565  4/1955  Japan ................................ 310/204

*Primary Examiner*—Elvin Enad
*Attorney, Agent, or Firm*—Sughrue, Mion, Zinn, Macpeak & Seas, PLLC

[57] ABSTRACT

A dynamo-electric machine comprises an armature having a winding composed of a wire or wires wound by a lap winding method through slots extending in the axial direction formed on the outer circumferential surface of a core secured to a shaft, a commutator having commutator segments secured to the shaft, and an equalize disposed adjacent to the commutator in the direction of the axis of the commutator having terminals stacked in the axial direction which electrically connect commutator segments which should have the same electric potential.

15 Claims, 16 Drawing Sheets

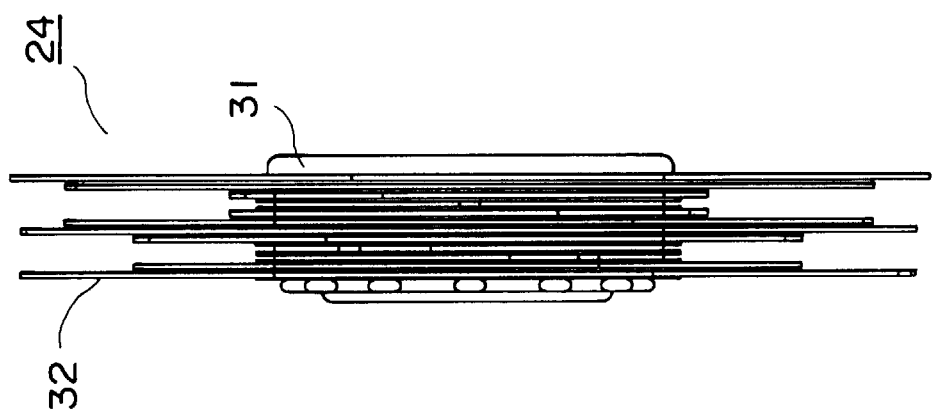
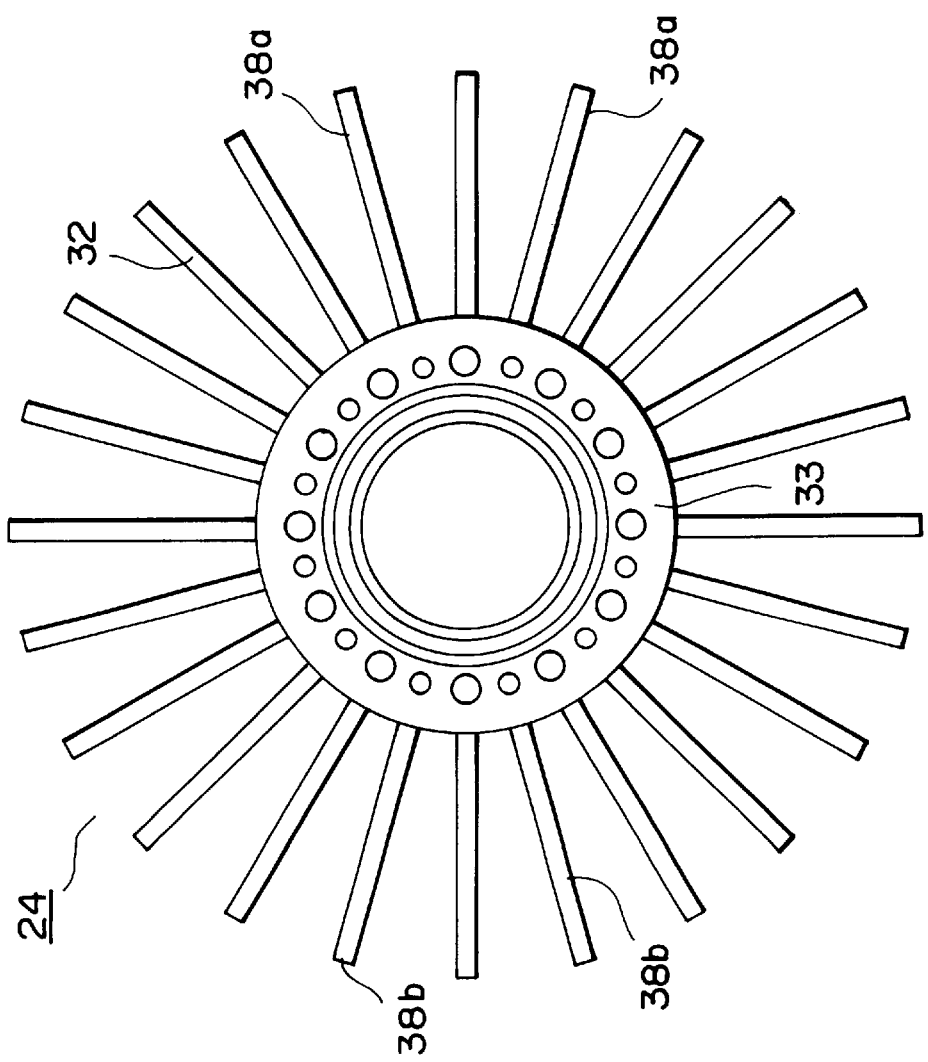

DYNAMO-ELECTRIC MACHINE HAVING A HOOK SHAPED COMMUTATOR AND EQUALIZER ATTACHED THERETO

BACKGROUND OF THE INVENTION

1. Field of the Invention

The present invention relates to a dynamo-electric machine which includes an equalizer which electrically connects commutator segments which have substantially the same electric potential, and to a method of manufacture therefor.

2. Description of the Related Art

FIG. 22 is a partial cross-section of a direct-current machine which is the dynamo-electric machine described in Japanese Utility Model Laid-Open No. (SHO) 56-149565. The direct-current machine comprises: an armature 3 secured to a shaft, having a winding 2 composed of a wire or wires wound by a lap winding method through slots formed so as to extend in the axial direction on the outer circumferential surface of a core 1; a commutator 5 secured to the shaft, comprising commutator segments 4 and risers 8; an equalizer 6 in contact with the outer surface of the commutator 5, which electrically connects commutator segments 4 which should have the same electric potential; brushes 7 in contact with the surface of the commutator segments 4; and a winding support portion 9 which supports the winding 2.

The equalizer 6 comprises: a support ring 11 having an annular groove formed on its inner wall; and equalizer coils 10 built into the annular groove stacked in layers in the axial direction. The surfaces of the equalizer coils 10 are insulated, and protruding portions 12 are formed at four locations equidistantly around the circumference of the inner circumferential surfaces thereof, as shown in FIG. 23. The protruding portions 12 are pressed into contact with the surface of the commutator segments 4 to connect commutator segments which should have the same electric potential.

One problem with the conventional direct-current machine is that the equalizer 6 is disposed radially outwards from the commutator 5, making the centrifugal force acting on the equalizer 6 that much greater, and there is a risk that the equalizer 6 may be damaged by that force.

Another problem is that the equalizer 6 is in contact with the surface of the commutator 5 and the commutator 5 must be made that much longer in the axial direction, increasing the size, and inevitably the cost, of the commutator 5.

Another problem is that the equalizer 6 and brushes 7 are close to each other and the brushes 7 hinder the installation and removal of the equalizer 6, making it difficult to work on.

Another problem is that the brushes 7 get in the way of disassembly and assembly of the direct-current machine itself, during maintenance, etc., also making it difficult to work on.

SUMMARY OF THE INVENTION

The present invention aims to solve the above problems and an object of the present invention is to provide a dynamo-electric machine wherein: the equalizer will not be damaged by centrifugal force; the commutator does not need to be made large for the sake of the equalizer, the installation and removal of the equalizer is improved; and the assembly and disassembly of the dynamo-electric machine itself is also improved; and to provide a method of manufacture therefor.

To this end, according to the present invention, there is provided a dynamo-electric machine comprising: an armature having a winding composed of a wire or wires wound by a lap winding method through slots extending in the axial direction formed on the outer circumferential surface of a core secured to a shaft; a commutator having commutator segments secured to the shaft; and an equalizer disposed adjacent to the commutator in the direction of the axis of the commutator having terminals stacked in the axial direction which electrically connect commutator segments which should have substantially the same electric potential.

According to another aspect of the present invention, there is provided a dynamo-electric machine comprising: an armature having a winding composed of a wire or wires wound by a lap winding method through slots extending in the axial direction formed on the outer circumferential surface of a core secured to a shaft; a commutator having commutator segments secured to said shaft; and an equalizer disposed adjacent to the commutator in the direction of the axis of the commutator having circumferentially-spaced terminals extending in the radial direction each electrically connecting commutator segments which have substantially the same electric potential.

According to another aspect of the present invention, there is provided a method of manufacture for a dynamo-electric machine comprising: an armature having a winding composed of a wire or wires wound by a lap winding method through slots extending in the axial direction formed on the outer circumferential surface of a core secured to a shaft; a commutator having commutator segments secured to the shaft; and an equalizer disposed adjacent to the commutator in the direction of the axis of the commutator having terminals which electrically connect commutator segments which have substantially the same electric potential; the method of manufacture comprising the steps of: contacting the wire to a surface of hooks on the commutator segments; contacting end portions of the terminals to another surface of the hooks; and electrically connecting the wire and end portions of the terminals to the hooks simultaneously by fusing.

BRIEF DESCRIPTION OF THE DRAWINGS

FIG. 3A is a developed front elevation of the equalizer in FIG. 1;

FIG. 3B is a side elevation of FIG. 3A;

DETAILED DESCRIPTION OF THE PREFERRED EMBODIMENTS

Embodiment 1

Figure 1:
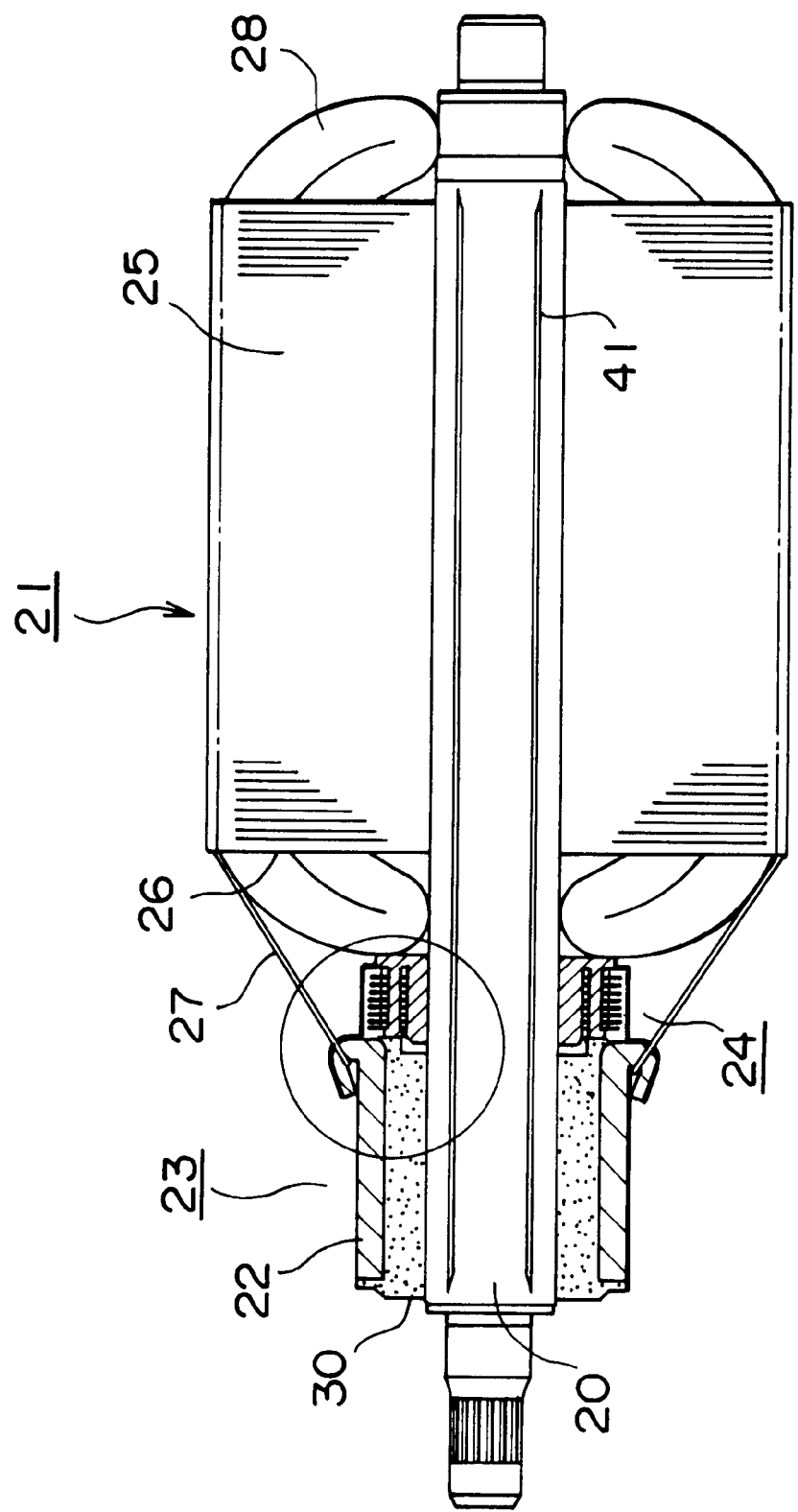
FIG. 1 is a cross-section of the interior of an electric motor according I to Embodiment 1 of the present invention.
Figure 2:
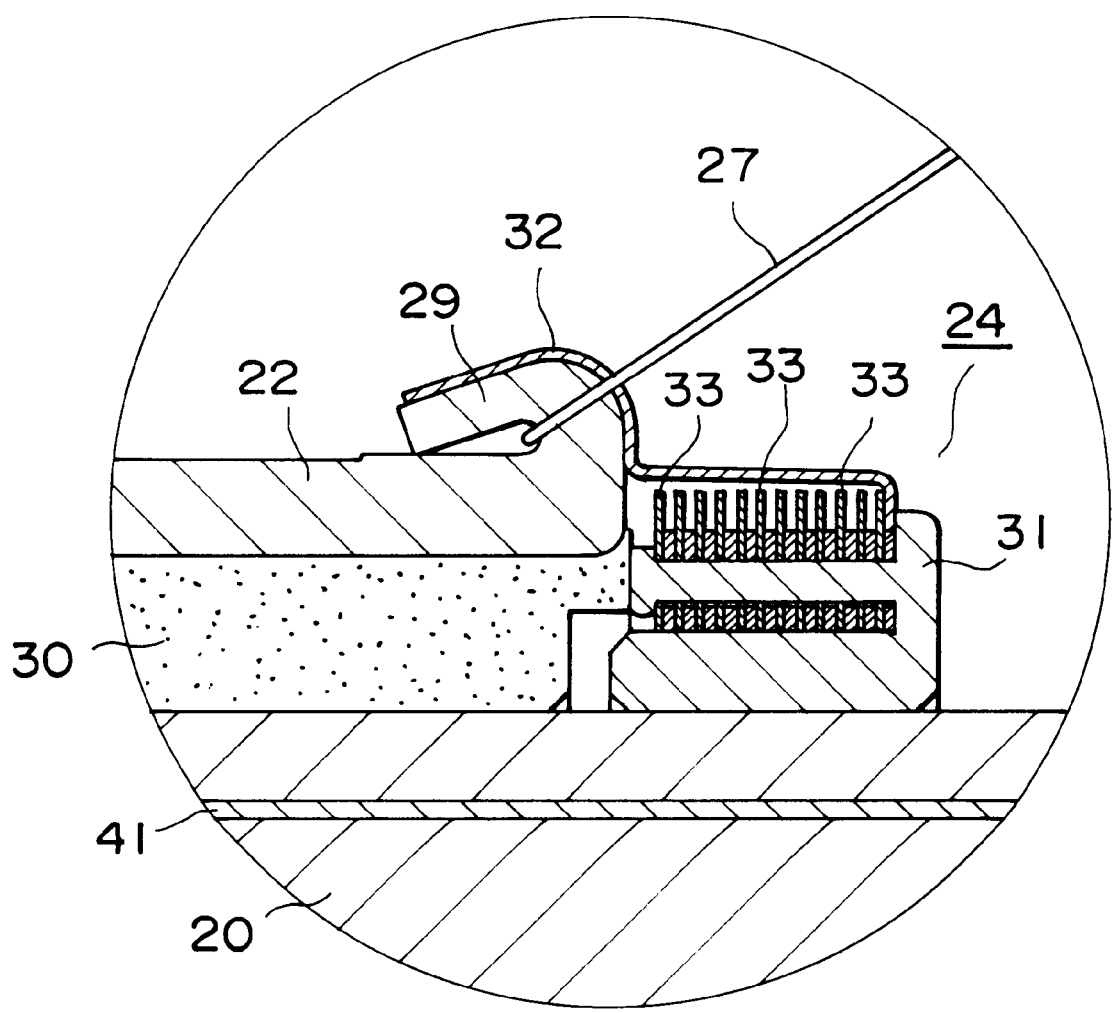
FIG. 2 is an enlargement of part of FIG. 1.

FIG. 1 is a cross-section of the interior construction of an electric motor according to Embodiment 1 of the present invention, and FIG. 2 is an enlargement of part of FIG. 1.

This electric motor comprises: an armature 21 secured to a shaft 20; a commutator 23 secured to the shaft 20, which converts a current supplied to the armature; and an equalizer 24 disposed adjacent to the commutator 23 in the direction of the axis of the commutator 23. Four permanent magnets (not shown) are disposed around the outside of the armature 21.

The armature 21 comprises: a core 25 having slots 26 formed on its outer circumferential surface extending in the axial direction; and a winding 28 composed of a wire or wires 27 wound by a lap winding method through the slots 26.

The commutator 23 comprises: commutator segments 22 arranged around the circumference of a shaft 20, each of which has a hook 29 formed in end portions thereof; and an insulating resin portion 30 composed of phenol resin, which secures the commutator segments 22.

FIG. 3A is a developed front elevation of the equalizer 24, FIG. 3B is a side elevation of the equalizer 24 in FIG. 3A. The equalizer 24 comprises: 12 terminals 32 composed of copper plate, etc., which are equalizer members, and 12 insulating plates 33, alternately stacked in layers on a base 31.

Figure 4A:
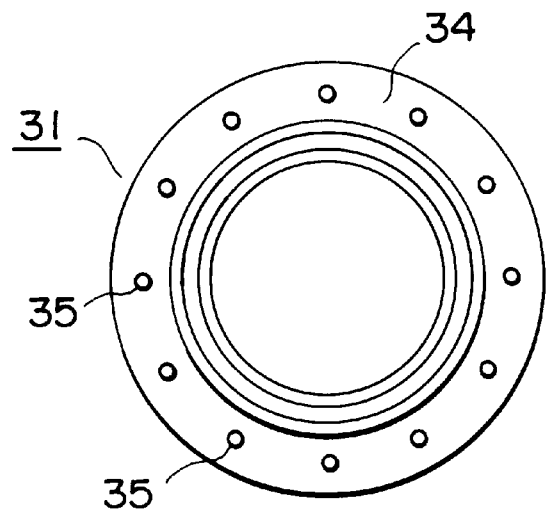
FIG. 4A is a front elevation of the base of the equalizer in FIG. 1.
Figure 4B:
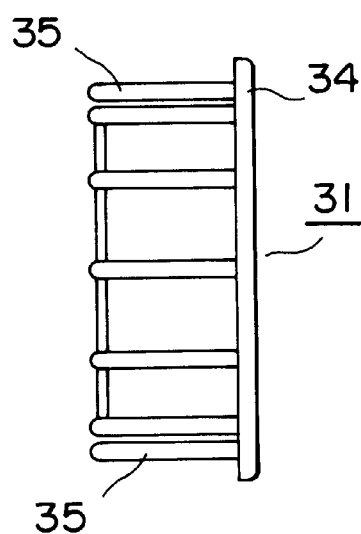
FIG. 4B is a side elevation of FIG. 4A.

FIG. 4A is a front elevation and FIG. 4B is a side elevation of the base 31. Twelve pins 35 are arranged equidistantly around the circumference of the toric base main body 34.

Figure 5:
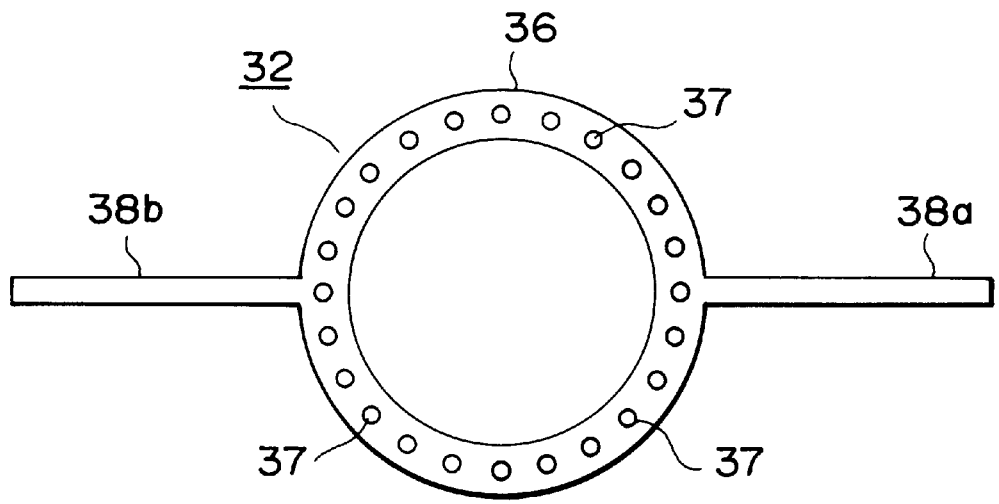
FIG. 5 is a front elevation of a terminal from the equalizer in FIG. 1.

FIG. 5 is a front elevation of one of the terminals 32, which are equalizer members. Apertures 37 are formed at 24 points equidistantly around the circumference of the annular terminal main body 36. Equalizer lead portions 38a, 38b extending radially outwards in opposite directions are disposed in the terminal main body 36.

Figure 6:
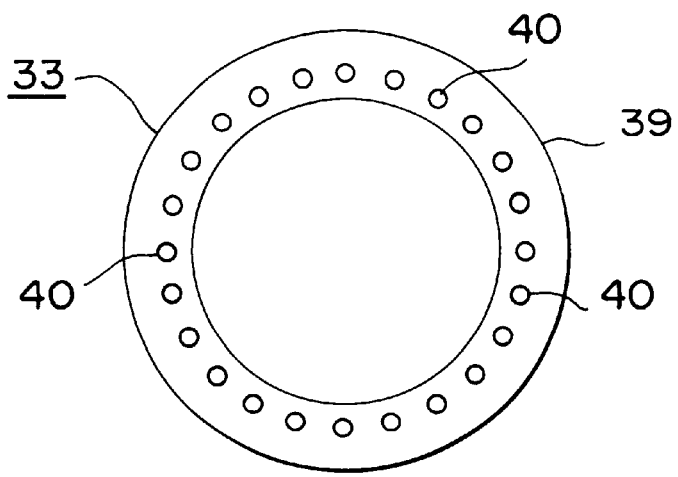
FIG. 6 is a front elevation of an insulating plate from the equalizer in FIG. 1.

FIG. 6 is a front elevation of one of the insulating plates 33. Apertures 40 are formed at 24 points equidistantly around the circumference of the annular insulating plate main body 36.

In the above electric motor, the equalizer 24 is assembled by alternately stacking the 12 terminals 32 and the 12 insulating plates 33 on the base 31. During this process, each successive terminal is rotated 15 degrees and the terminals 32 are secured to the base 31 by passing the pins 35 of the base 31 through the apertures 37 in the terminals 32. The insulating plates 33 are secured to the base 31 by passing the pins 35 of the base 31 through the apertures 40 in the insulating plates 33. Then, the equalizer 24 is integrated by crimping end portions of the pins 35.

Then, the equalizer 24 and the commutator 23 are fitted onto the shaft 20 in that order. Protrusions 41 extending in the axial direction are formed on the shaft 20 in order to position the equalizer 24 and the commutator 23 relative to the direction of rotation. The base 31 and the insulating resin portion 30, which are both composed of phenol resin, are secured to the protrusions 41 by elastic deformation.

Figure 7:
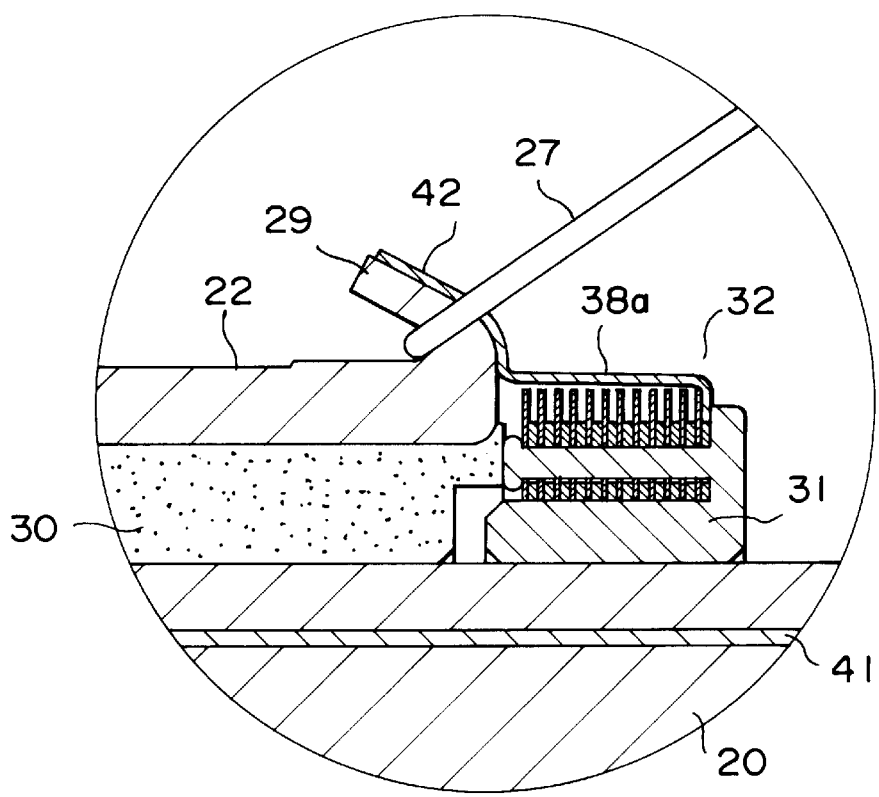
FIG. 7 is a diagram showing the connection between the terminals of the equalizer and the segments of the commutator in FIG. 1.

Next, the armature 21 is formed by bending the equalizer lead portions 38a, 38b to align with the hooks 29, and forming the winding 27 by winding the wire 27 into the core 25 by a lap winding method. As shown in FIG. 7, the wire 27 is secured by one surface of the hooks 29 on the commutator segments 22, and end portions 42 of the terminals 32 contact another surface of the hooks 29. Thereafter, the wire 27 and the end portions 42 of the terminals 32 are electrically connected to the hooks 29 simultaneously by fusing.

In the above embodiment of an electric motor, the equalizer 24, having terminals 32 stacked with intermediate insulating plates 33, is disposed adjacent to one end of the commutator 23 so that the centrifugal force acting on the equalizer 24 is small, preventing damage to the equalizer 24 due to centrifugal force and reducing the length of the shaft 20 in the axial direction. Moreover, the installation and removal of the equalizer 24 can be performed without hindrance from brushes. Furthermore, the assembly and disassembly of the electric motor itself is improved.

Embodiment 2

Figure 8:
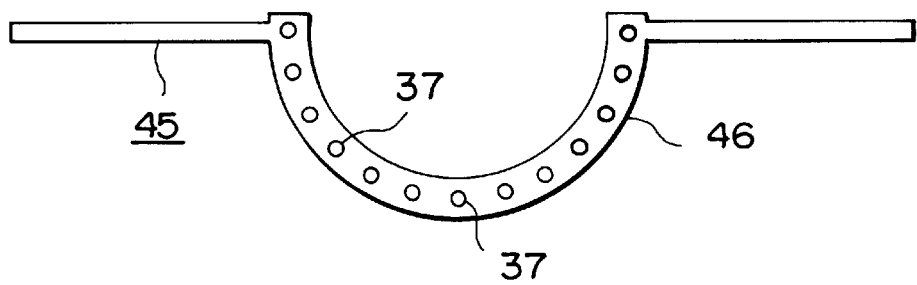
FIG. 8 is a front elevation of a terminal from an equalizer of an electric motor according to Embodiment 2 of the present invention.

FIG. 8 is a front elevation of one of the terminals 45 used in an equalizer according to Embodiment 2 of the present invention. In the explanations of each of the subsequent embodiments, parts which are identical or correspond to those in Embodiment 1 will be given the same numerals.

In this embodiment, the terminal main body 46 of each of the terminals 45 of the equalizer is arc-shaped, so that the amount of copper material used can be essentially halved in comparison to the terminals 32 of Embodiment 1.

Embodiment 3

Figure 9:
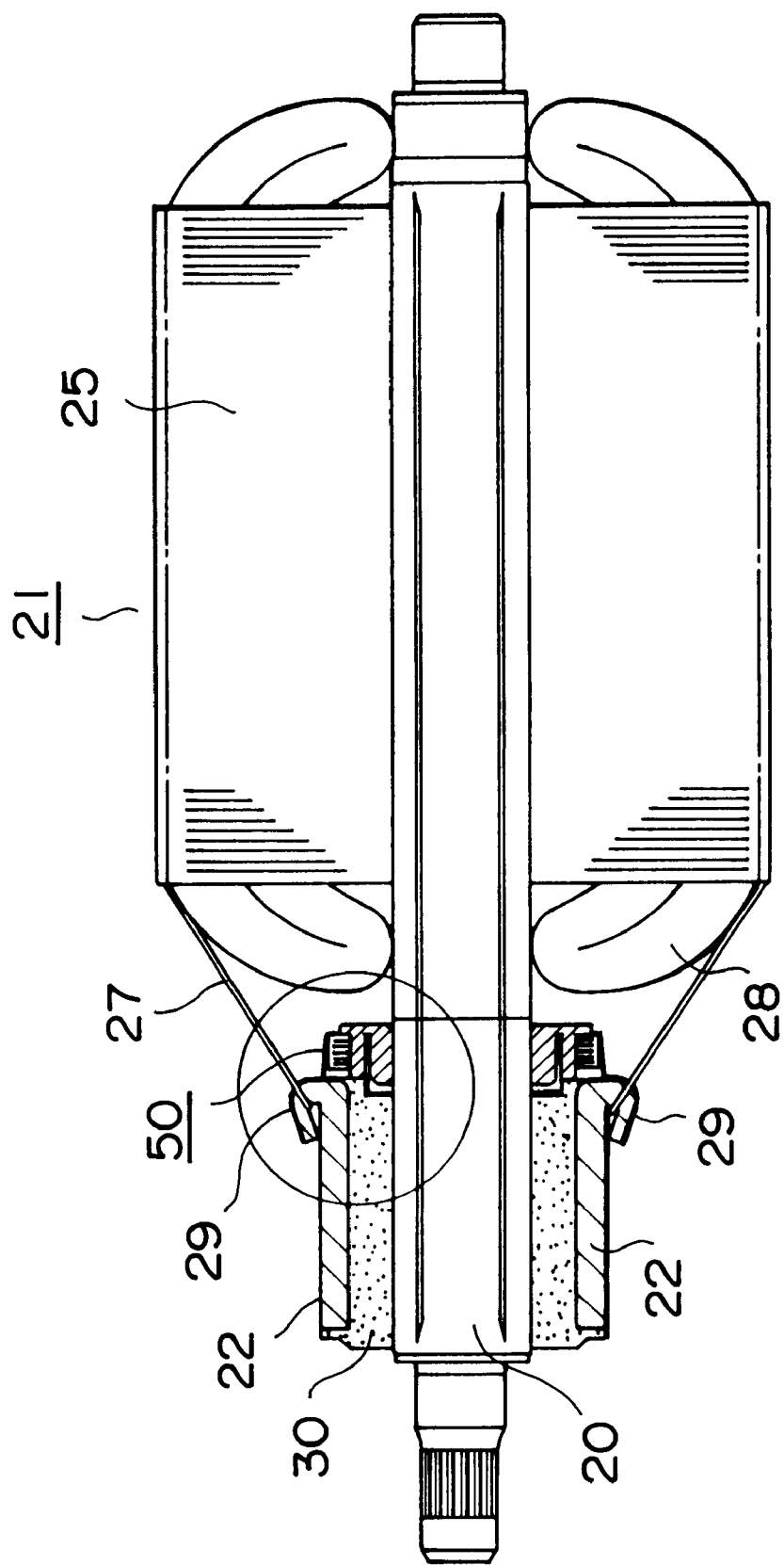
FIG. 9 is a cross-section of the interior of an electric motor according to Embodiment 3 of the present invention.
Figure 10:
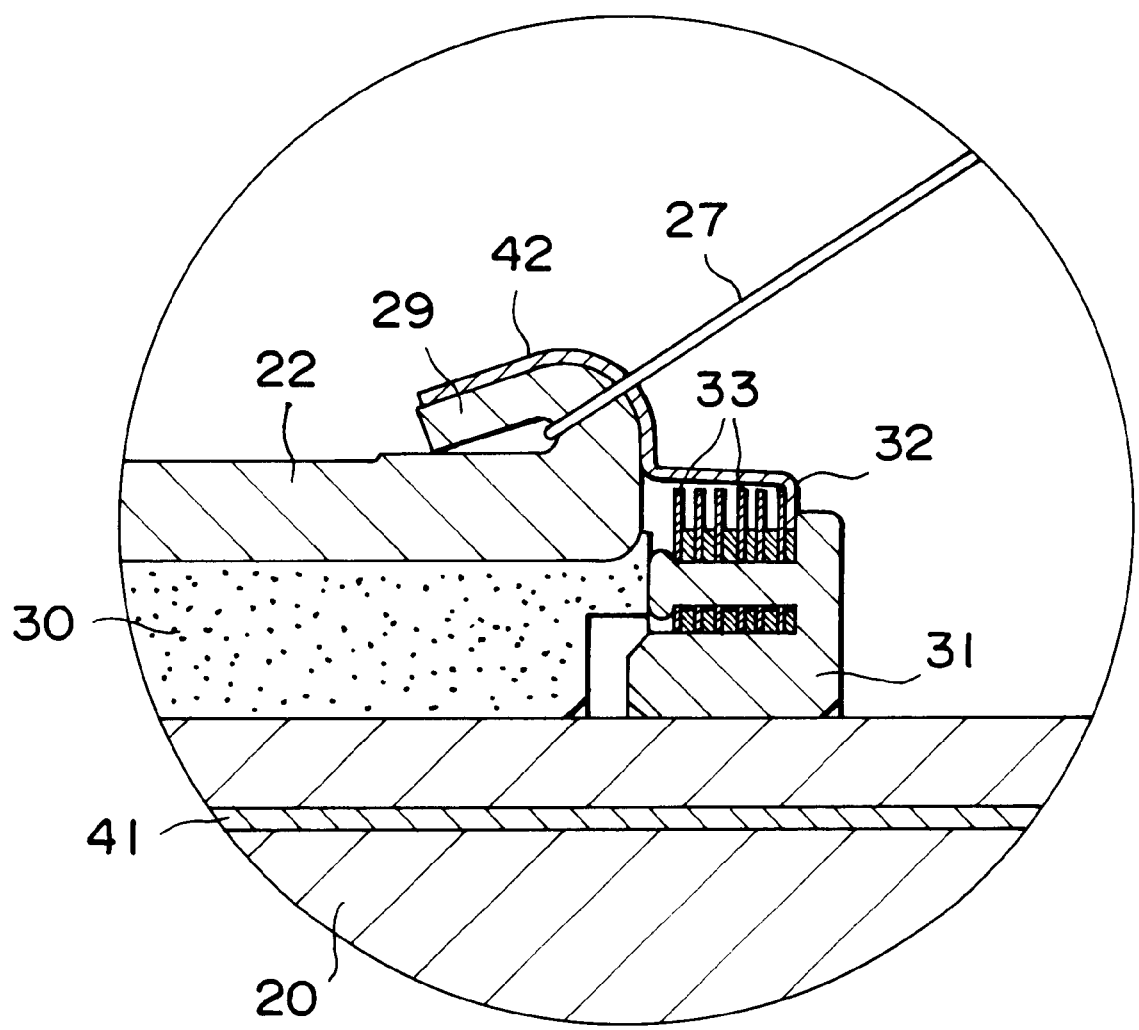
FIG. 10 is an enlargement of part of FIG. 9.

FIGS. 9 and 10 show Embodiment 3 of the present invention. In this embodiment, 6 terminals 32 and 6 insulating plates 33 of the equalizer 50 are stacked alternately on the base 31, and every second commutator segment 22 and an end of every second terminal 32 are electrically connected via hooks 29. Alternatively, every third commutator segment 22 and every third terminal 32 of the equalizer may be electrically connected.

Embodiment 4

Figure 11:
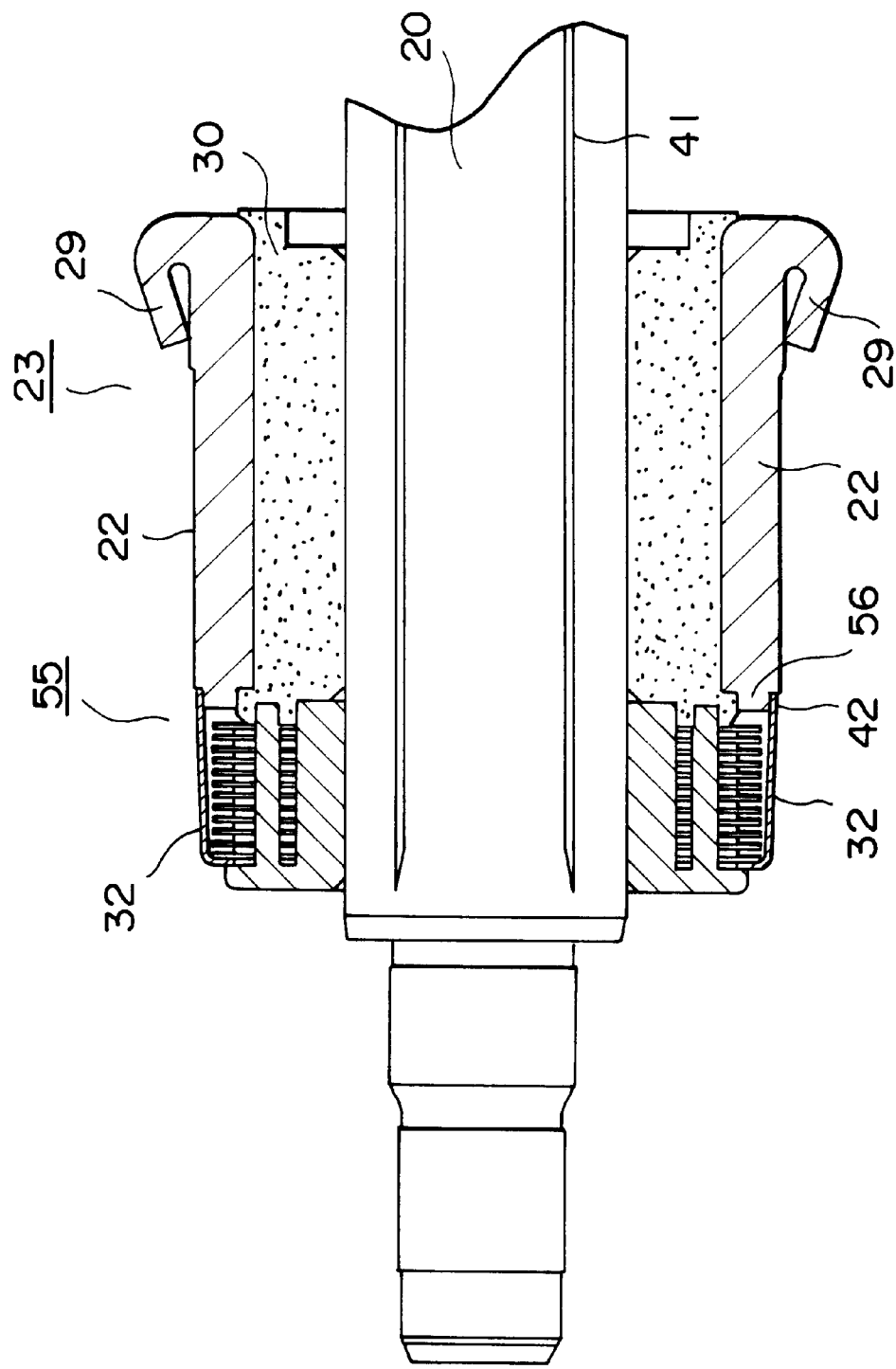
FIG. 11 is a cross-section of the interior of an electric motor according to Embodiment 4 of the present invention.

FIG. 11 shows Embodiment 4 of the present invention. The equalizer 55 of this embodiment is disposed adjacent to the commutator 23 at the opposite end of the commutator 23 to the hooks 29. The end portions 42 of the terminals 32 of the equalizer 55 are electrically connected to the end portions 56 of the commutator segments 22 by fusing.

In this embodiment, there is a space between the armature 21 and the commutator 23, so that the electrical connection of the wire 27 of the armature 21 to the hooks 29 of the commutator 23 can be performed without hindrance from the equalizer 55.

Embodiment 5

Figure 12:
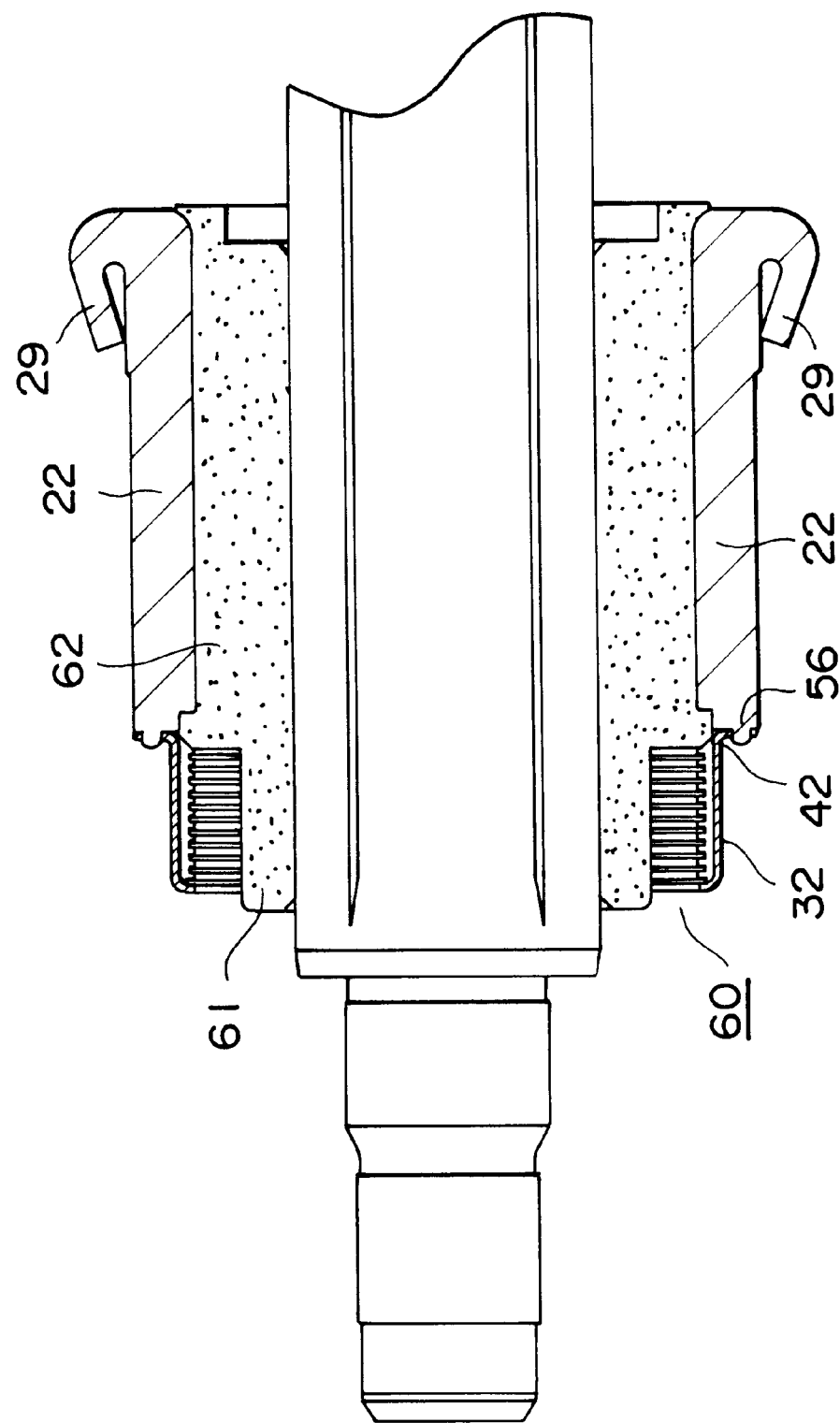
FIG. 12 is a cross-section of the interior of an electric motor according to Embodiment 5 of the present invention.

FIG. 12 shows Embodiment 5 of the present invention. The main difference from Embodiment 4 is that the base 61 of the equalizer 60 and the inner radial portion 62 of the commutator 23 in Embodiment 5 are integrated by means of phenol resin.

In this embodiment, the commutator 23 and the equalizer 60 are integrated, making the assembly and disassembly of the electric motor that much simpler.

Embodiment 6

Figure 13:
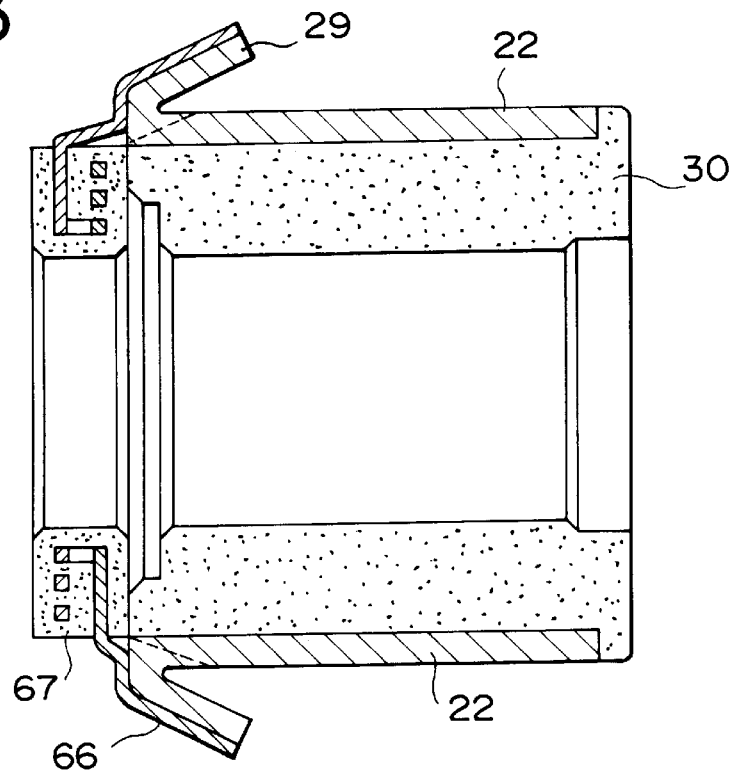
FIG. 13 is a cross-section of an equalizer of an electric motor according to Embodiment 6 of the present invention.
Figure 14:
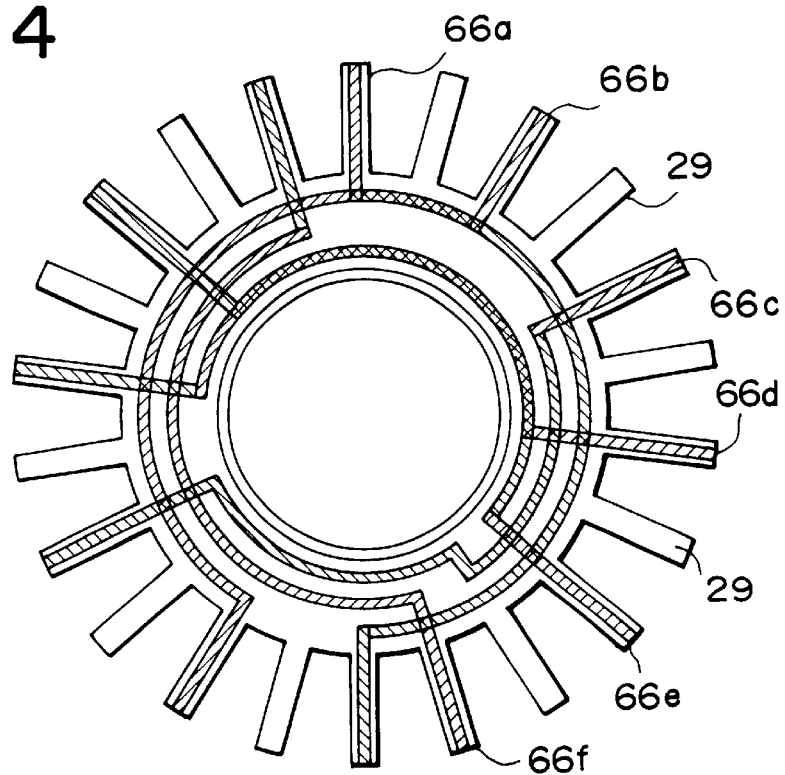
FIG. 14 is a developed front elevation of the terminals of the equalizer in FIG. 13.
Figure 15A:
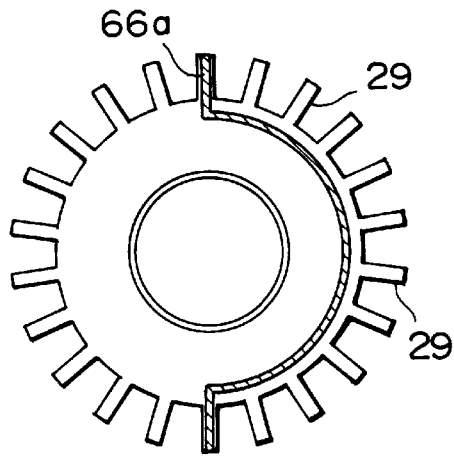
FIGS. 15A to F are developed front elevations of each of the terminals in FIG. 13.
Figure 15B:
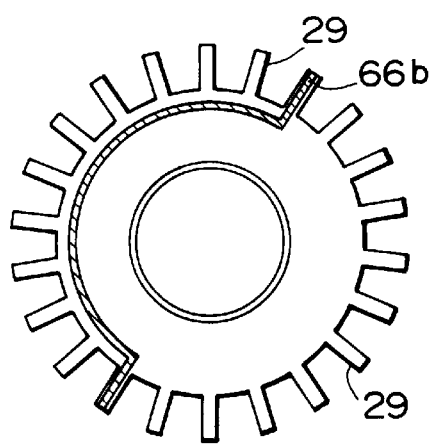
Figure 15C:
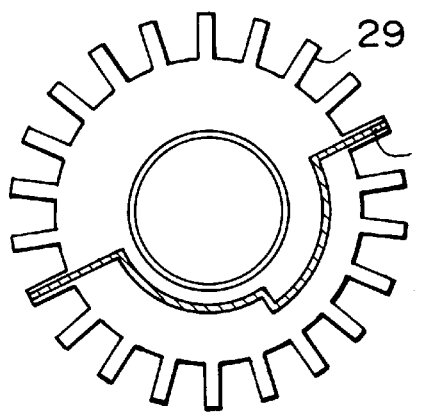
Figure 15D:
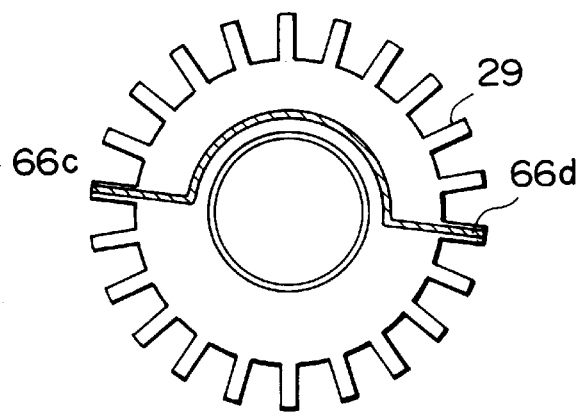
Figure 15E:
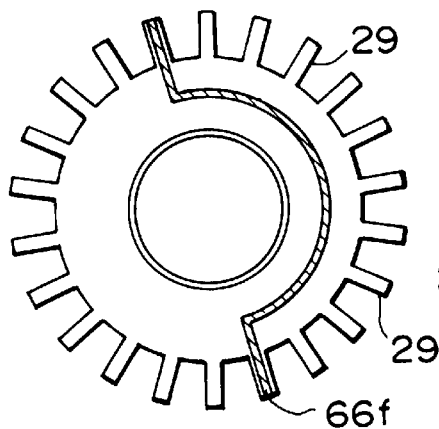
Figure 15F:
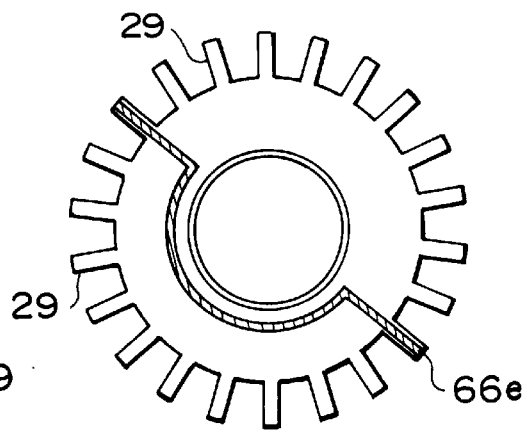

FIGS. 13 to 15 show Embodiment 6 of the present invention. In this equalizer 65, first to sixth terminals 66a to 66f, which are spaced in the circumferential direction and extend in the radial direction, each electrically connect commutator segments 22 having the same charge as each other. The main bodies of these terminals 66a to 66f are shaped in arcs of different diameter, as can be seen from FIGS. 15A to 15F. The terminals 66a to 66f are all secured by an insulating resin portion 67.

In this embodiment, the terminals 66a to 66f are aligned in the radial direction, enabling the length of the electric motor in the axial direction to be shortened even more than in Embodiment 1.

Embodiment 7

Figure 16:
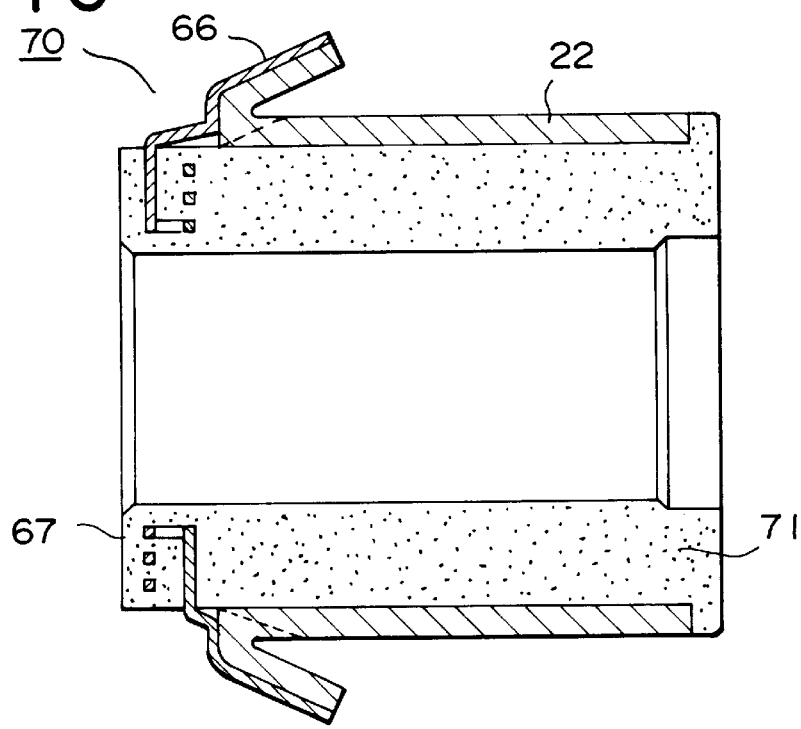
FIG. 16 is a cross-section of an equalizer of an electric motor according to Embodiment 7 of the present invention.

FIG. 16 shows Embodiment 7 of the present invention. The main difference from Embodiment 6 is that the base 67 of the equalizer 70 and the inner radial portion 71 of the commutator 23 in Embodiment 7 are integrated by means of phenol resin.

In this embodiment, the commutator 23 and the equalizer 70 are integrated, making the assembly and disassembly of the electric motor that much simpler.

Embodiment 8

Figure 17:
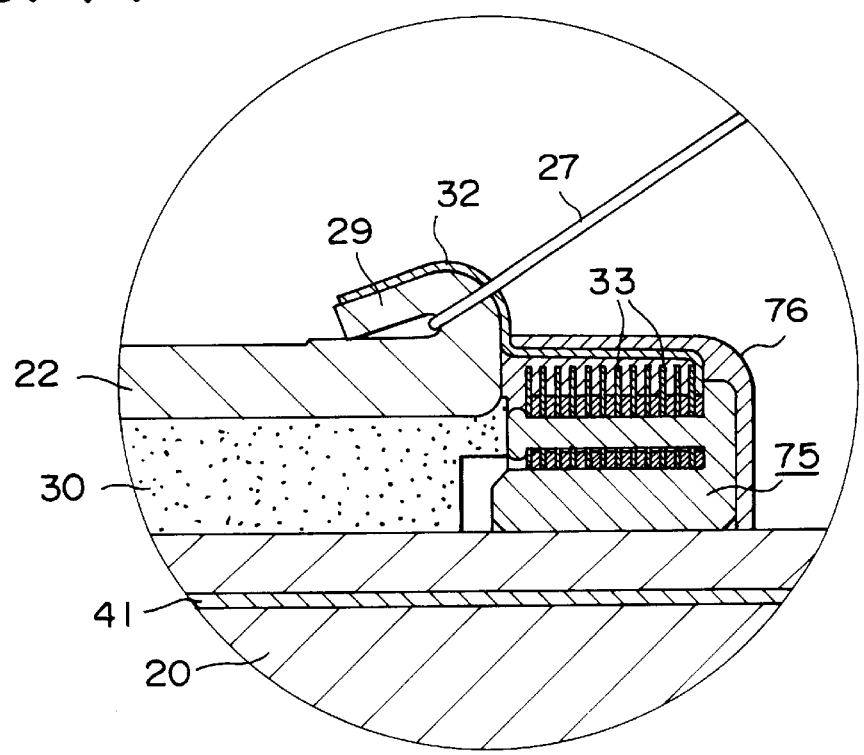
FIG. 17 is a cross-section of an equalizer of an electric motor according to Embodiment 8 of the present invention.

FIG. 17 shows Embodiment 8 of the present invention. The main difference from Embodiment 1 is that an insulating resin coat 76 is formed on the surface of the equalizer 75 in Embodiment 8 to prevent the terminals 32 from short-circuiting each other.

Embodiment 9

Figure 18:
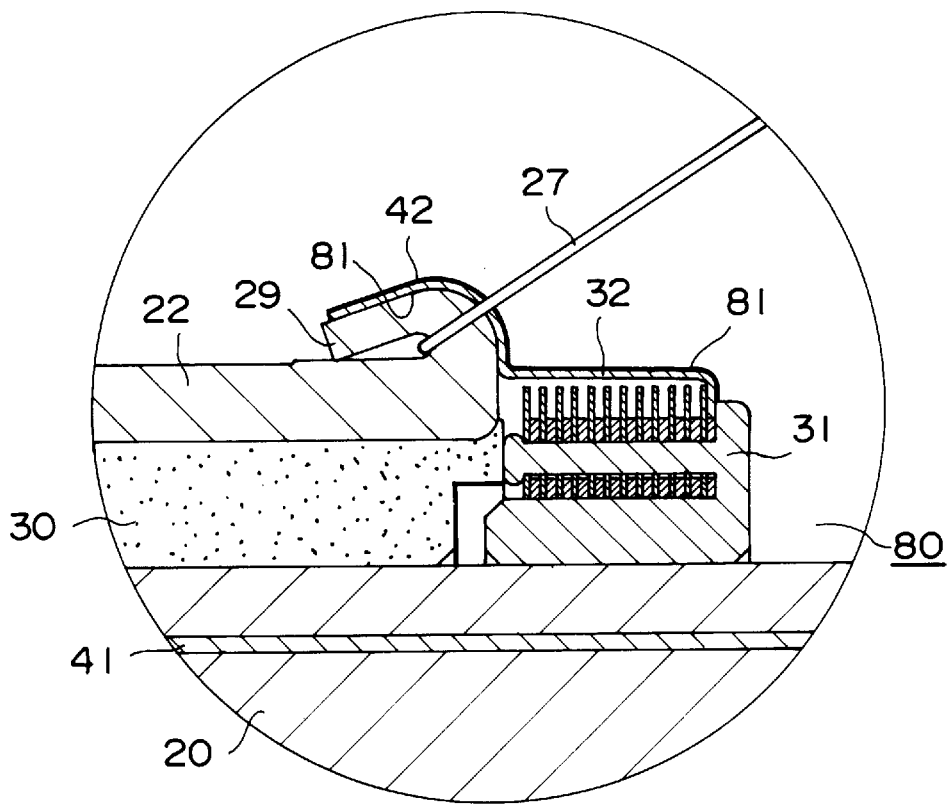
FIG. 18 is a cross-section of an equalizer of an electric motor according to Embodiment 9 of the present invention.
Figure 19:
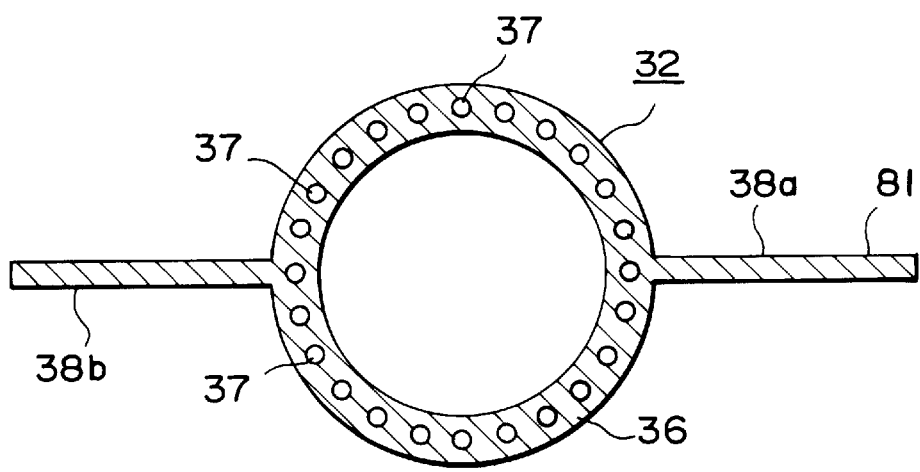
FIG. 19 is a front elevation of a terminal from FIG. 18.
Figure 20:
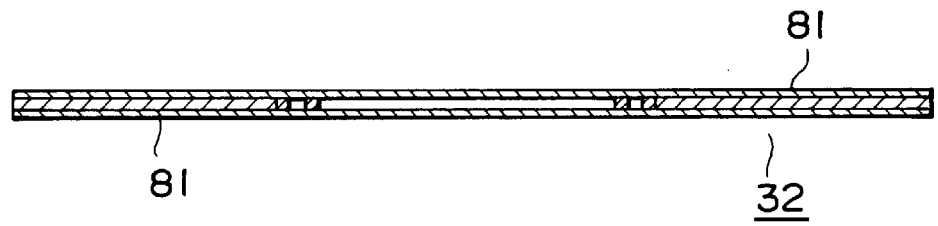
FIG. 20 is a cross-section of a terminal from FIG. 18.

FIGS. 18 to 20 show Embodiment 9 of the present invention. The main difference from Embodiment 1 is that, in the equalizer 75 in Embodiment 8, a metal coat 81 composed of tin plate is formed on both surfaces of the terminals 32 which are electrically connected to the commutator segments 22.

In this embodiment, a metal coat 81 composed of tin plate is formed on end portions 42 of the terminals 32 which are electrically connected to the commutator segments 22 to secure the end portions 42 of the terminals 32 to the commutator segments 22, so that the end portions 42 of the terminals 32 are secured more firmly to the commutator segments 22 by the metal coat 81 and the circuit is unlikely to be broken at the end portions 42 of the terminals 32 even when subjected to intense vibrations.

Embodiment 10

Figure 21:
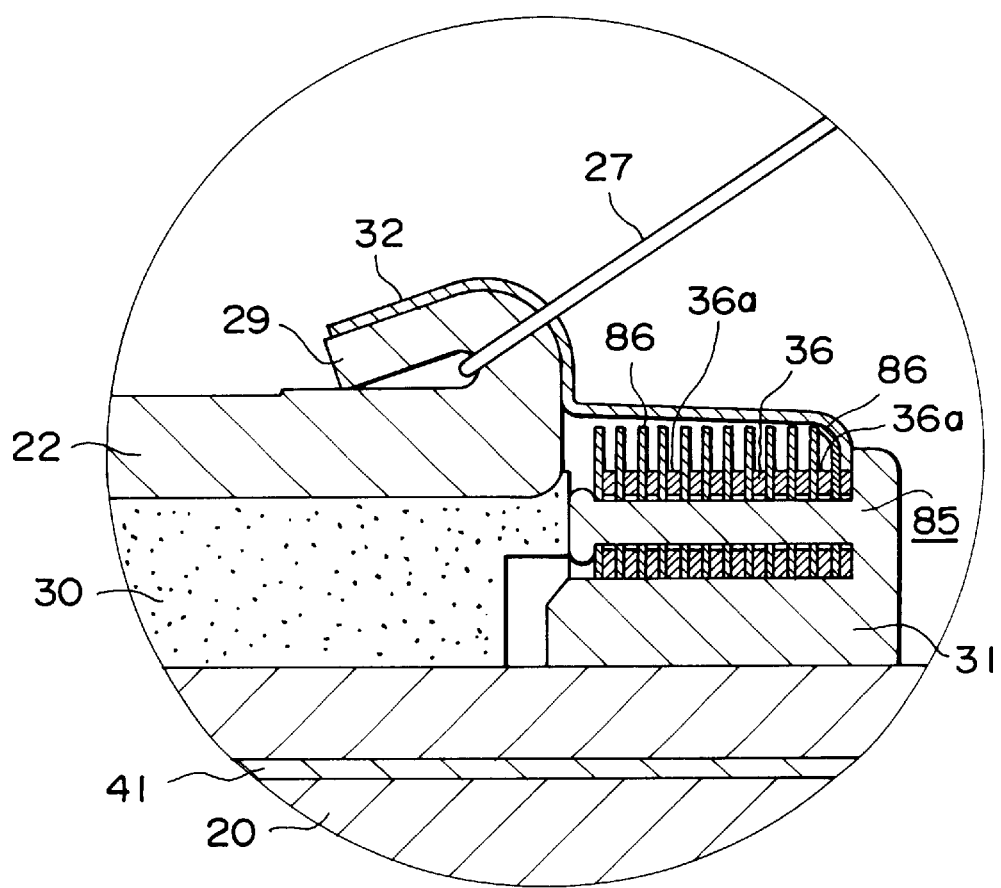
FIG. 21 is a cross-section of part of an electric motor according to Embodiment 10 of the present invention.
Figure 22:
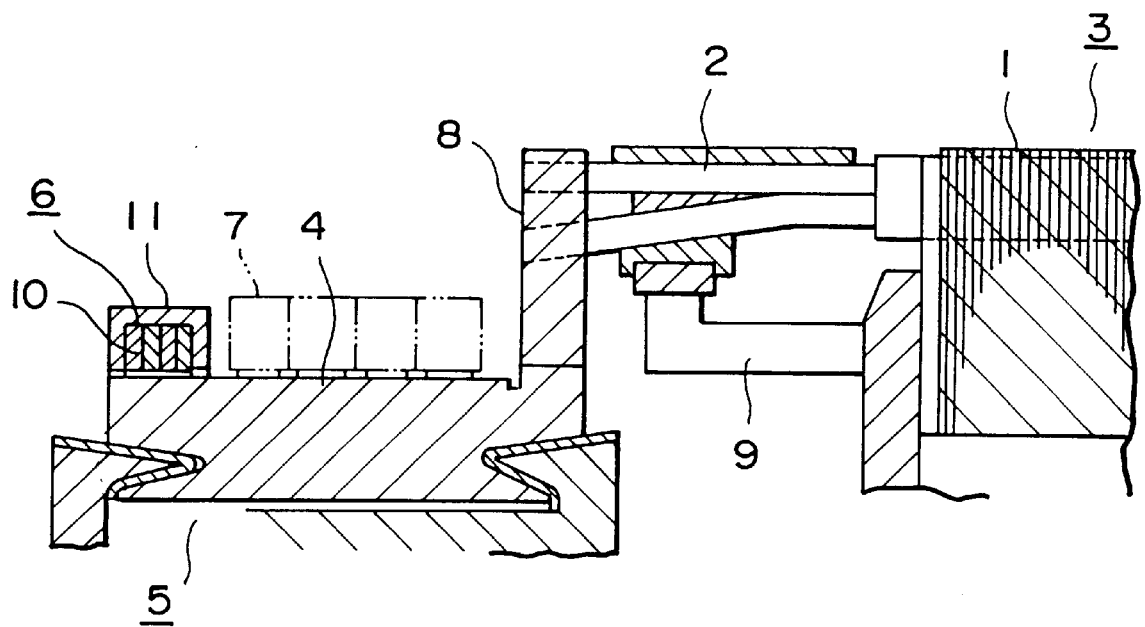
FIG. 22 is a cross-section of part of a conventional electric motor.
Figure 23:
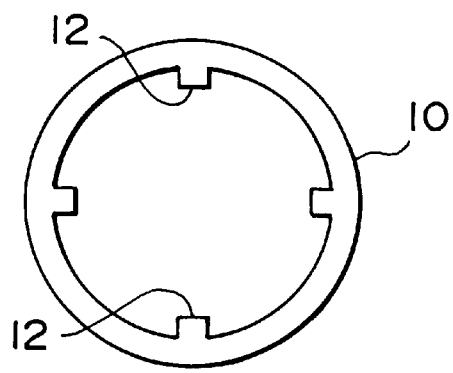
FIG. 23 is a front elevation of an equalizer coil from FIG. 22.

FIG. 21 shows Embodiment 10 of the present invention. In the equalizer 85 in this embodiment, the outer diameter of the insulating plates 86, which are composed of flexible polyamide paper, is larger than the outer diameter of the terminal main bodies 36, and the size of the insulating plates 86 is such that the insulating plates 86 cover the outer circumferential edge surfaces 36a of adjacent terminal main bodies 36.

In this embodiment, the insulating plates 86 are reliably interposed between bent terminals 32 and terminals 32 adjacent to the bent terminals 32, reliably preventing the terminals 32 from short-circuiting each other.

Each of the embodiments of the present invention has been explained using an electric motor as an example of a dynamo-electric machine, but the present invention can also be applied to a generator.

As explained above, the dynamo-electric machine according to one aspect of the present invention, comprises: an armature having a winding composed of a wire or wires wound by a lap winding method through slots extending in the axial direction formed on the outer circumferential surface of a core secured to a shaft; a commutator having commutator segments secured to the shaft; and an equalizer disposed adjacent to the commutator in the direction of the axis of the commutator having terminals stacked in the axial direction which electrically connect commutator segments which should have the same electric potential. Therefore, the equalizer is disposed in a position adjacent to the shaft so that the centrifugal force acting on the equalizer is small, enabling the prevention of damage to the equalizer due to centrifugal force. The length of the commutator and the dynamo-electric machine can also be reduced in the axial direction. Moreover, the installation and removal of the equalizer can be performed smoothly without hindrance from brushes. Furthermore, the assembly and disassembly of the dynamo-electric machine itself is improved.

According to one form of the dynamo-electric machine, the equalizer may comprise: a base; terminals stacked on the base; and insulating plates interposed between each of the terminals to prevent short-circuiting between the terminals. Therefore, the equalizer enables reliable prevention of short-circuiting between the terminals by means of a simple construction.

According to another form of the dynamo-electric machine, each of the terminals may comprise: an annular terminal main body; and equalizer lead portions extending radially outwards from the terminal main body. Therefore, each of the commutator segments can be connected by changing the angle of individual terminals in the circumferential direction as the terminals are stacked.

According to another aspect of the dynamo-electric machine of the present invention, the dynamo-electric machine comprises: an armature having a winding composed of a wire or wires wound by a lap winding method through slots extending in the axial direction formed on the outer circumferential surface of a core secured to a shaft; a commutator having commutator segments secured to said shaft; and an equalizer disposed adjacent to the commutator in the direction of the axis of the commutator having circumferentially-spaced terminals extending in the radial direction each electrically connecting commutator segments which should have the same electric potential. Therefore, the equalizer is disposed in a position adjacent to the shaft so that the centrifugal force acting on the equalizer is small, enabling the prevention of damage to the equalizer due to centrifugal force. The length of the commutator and the dynamo-electric machine can also be reduced in the axial direction. Moreover, the installation and removal of the equalizer can be performed smoothly without hindrance from brushes.

According to one form of the dynamo-electric machine, the equalizer may comprise: terminals; and an insulating resin portion to integrate the terminals and to prevent short-circuiting between each of the terminals. Therefore, short-circuiting between the terminals can be reliably prevented by means of a simple construction.

According to another form of the dynamo-electric machine, each of the terminals may comprise: an arc-shaped terminal main body; and equalizer lead portions extending radially outwards from the terminal main body. Therefore, each of the commutator segments can be connected by changing the angle of individual terminals in the circumferential direction.

According to still another form of the dynamo-electric machine, the base and the inner circumferential portions of the commutator may be integrated by means of resin. Therefore, the commutator and the equalizer can be handled as a unit, making the assembly and disassembly of the dynamo-electric machine that much simpler.

According to one form of the dynamo-electric machine, the insulating resin portion and the inner circumferential portions of the commutator may be integrated by means of resin. Therefore, the commutator and the equalizer can be handled as a unit, making the assembly and disassembly of the dynamo-electric machine that much simpler.

According to another form of the dynamo-electric machine, an insulating resin coat may be formed on the surfaces of the equalizer. Therefore, short-circuiting between the terminals can be more reliably prevented.

According to still another form of the dynamo-electric machine, a metal coat may be formed on end portions of the terminals which are electrically connected to the commutator segments to secure the end portions to the commutator segments. Therefore, the end portions of the terminals are more firmly secured to the commutator segments, reducing the likelihood that the circuit will be broken at the end portions of the terminals even when subjected to intense vibrations.

According to one form of the dynamo-electric machine, the metal coat may be tin plate. Therefore, the end portions of the terminals are more firmly secured to the commutator segments at low cost.

According to another form of the dynamo-electric machine, the insulating plates may be flexible. Therefore, malfunctions due to shortcircuiting resulting from the insulating plates being damaged when the terminals are bent can be prevented.

According to still another form of the dynamo-electric machine, the outer diameter of the insulating plates may be larger than the outer diameter of the terminal main bodies, and the size of the insulating plates may be such that the insulating plates cover the outer circumferential edge surfaces of adjacent terminal main bodies. Therefore, the insulating plates are reliably interposed between bent terminals and terminals adjacent to the bent terminals, reliably preventing the terminals from short-circuiting each other.

According to one form of the dynamo-electric machine, the wire may be electrically connected to one surface of hooks on the commutator segments and the end portions of the terminals may be electrically connected to another surface of the hooks. Therefore, the wire and the terminals are connected to the same hooks, limiting the connections to the hooks only, thereby improving the assembly operation.

According to still another aspect of the method of manufacture for a dynamo-electric machine of the present invention, the method of manufacture comprise the steps of: contacting a wire to a surface of hooks on commutator segments; contacting end portions of terminals to another surface of hooks; and electrically connecting the wire and end portions of the terminals to the hooks simultaneously by fusing. Therefore, the connection process is simplified, thereby improving the productivity of the dynamo-electric machine.

What is claimed is:

1. A dynamo-electric machine comprising:

a commutator having commutator segments secured to a shaft;

an armature having a winding composed of a wire or wires wound by a lap winding method through slots extending in the axial direction formed on the outer circumferential surface of a core secured to said shaft, with said wire or wires being directly electrically attached to a portion of said commutator segments;

and an equalizer disposed adjacent to said commutator in the direction of the axis of said commutator having terminals stacked in the axial direction which are directly electrically attached to a portion of said commutator segments separate from said wires, and which electrically connect commutator segments which having substantially the same electric potential.

2. The dynamo-electric machine according to claim 1, wherein said equalizer comprises:

a base;

terminals stacked on said base; and insulating plates interposed between each of said terminals to prevent short-circuiting between said terminals.

3. The dynamo-electric machine according to claim 2, wherein each of said terminals comprise:

an arc-shaped terminal main body; and equalizer lead portions extending radially outwards from said terminal main body.

4. The dynamo-electric machine according to claim 2, wherein said base and the inner circumferential portions of said commutator are integrated by means of resin.

5. The dynamo-electric machine according to claim 2, wherein said insulating plates are flexible.

6. The dynamo-electric machine according to claim 5, wherein the outer diameter of said insulating plates is larger than the outer diameter of annular terminal main bodies of said terminals, and the size of said insulating plates is such that said insulating plates cover the outer circumferential edge surfaces of adjacent terminal main bodies.

7. The dynamo-electric machine according to claim 2, wherein each of said terminals comprise:

an annular terminal main body; and equalizer lead portions extending radially outwards from said terminal main body.

8. The dynamo-electric machine according to claim 1, wherein said equalizer comprises:

terminals; and an insulating resin portion to integrate said terminals and to prevent short-circuiting between each of said terminals.

9. The dynamo-electric machine according to claim 8, wherein said insulating resin portion and the inner circumferential portions of said commutator are integrated by means of resin.

10. The dynamo-electric machine according to claim 1, wherein an insulating resin coat is formed on the surfaces of said equalizer.

11. The dynamo-electric machine according to claim 1, wherein a metal coat is formed on end portions of said terminals which are directly electrically connected to said commutator segments to secure said end portions to said commutator segments.

12. The dynamo-electric machine according to claim 11, wherein said metal coat is tin plate.

13. The dynamo-electric machine according to claim 1, wherein each commutator segment has a hook shaped protrusion, and said wire is electrically connected to one surface of the hook-shaped protrusions on said commutator segments and the end portions of said terminals are electrically connected to another surface of said hook-shaped protrusions.

14. A dynamo-electric machine comprising:
- a commutator having commutator segments secured to a shaft;
- an armature having a winding composed of a wire or wires wound by a lap winding method through slots extending in the axial direction formed on the outer circumferential surface of a core secured to said shaft, with said wire or wires being directly electrically attached to a portion of said commutator segments;
- and an equalizer disposed adjacent to said commutator in the direction of the axis of said commutator having circumferentially-spaced terminals extending in the radial direction each electrically connecting commutator segments which have substantially the same electric potential, and each attached to a portion of said commutator segments separate from said wires.

15. A method of manufacture for a dynamo-electric machine comprising:
- an armature having a winding composed of a wire or wires wound by a lap winding method through slots extending in the axial direction formed on the outer circumferential surface of a core secured to a shaft;
- a commutator having commutator segments secured to said shaft;
- and an equalizer disposed adjacent to said commutator in the direction of the axis of said commutator having terminals which electrically connect commutator segments which have substantially the same electric potential;

said method of manufacture comprising the steps of:

contacting said wire to a surface of hooks on said commutator segments;

contacting end portions of said terminals to another surface of said hooks; and electrically connecting said wire and end portions of said terminals to said hooks simultaneously by fusing.

* * * * *